(12) United States Patent
Li et al.

(10) Patent No.: US 11,096,048 B2
(45) Date of Patent: Aug. 17, 2021

(54) IDENTITY AUTHENTICATION METHOD AND COMMUNICATIONS TERMINAL

(71) Applicant: Huawei Technologies Co., Ltd., Shenzhen (CN)

(72) Inventors: Yan Li, Shenzhen (CN); Wenjuan Chen, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 16/313,036

(22) PCT Filed: Jun. 30, 2016

(86) PCT No.: PCT/CN2016/088039
§ 371 (c)(1),
(2) Date: Dec. 23, 2018

(87) PCT Pub. No.: WO2018/000396
PCT Pub. Date: Jan. 4, 2018

(65) Prior Publication Data
US 2019/0230507 A1 Jul. 25, 2019

(51) Int. Cl.
*H04L 9/32* (2006.01)
*H04W 12/06* (2021.01)
(Continued)

(52) U.S. Cl.
CPC .......... *H04W 12/06* (2013.01); *H04L 9/3231* (2013.01); *H04L 9/3297* (2013.01); *H04W 12/08* (2013.01); *H04W 12/69* (2021.01)

(58) Field of Classification Search
CPC ....... H04L 9/32; H04L 9/3231; H04L 9/3234; H04L 9/3297; H04W 12/06; H04W 12/0605; H04W 12/08; H04W 12/0051
See application file for complete search history.

(56) References Cited

U.S. PATENT DOCUMENTS 9,600,676 B1\* 3/2017 Farmer ............... G06F 21/6254
9,871,779 B2\* 1/2018 Sheller .................... G06F 21/31
(Continued)

FOREIGN PATENT DOCUMENTS

CN       104102915 A    10/2014
CN       104243165 A    12/2014
(Continued)

*Primary Examiner* — Khang Do
(74) *Attorney, Agent, or Firm* — Slater Matsil, LLP

(57) ABSTRACT

The present disclosure relates to an identity authentication method and a communications terminal. One example method includes: performing, by a terminal, first identity authentication on first user identity feature data; if the first identity authentication succeeds, and the wearable device is in a valid worn state, when receiving an access request for a preset application, obtaining, by the terminal, a service security level of the preset application, and obtaining an authentication time point for second identity authentication and matching accuracy of the second identity authentication; determining whether a difference between a current time point and the authentication time point is less than authentication validity duration corresponding to the service security level and whether the matching accuracy is higher than lowest matching accuracy corresponding to the service security level; and if yes, accepting the access request.

20 Claims, 3 Drawing Sheets

(51) Int. Cl.
*H04W 12/69* (2021.01)
*H04W 12/08* (2021.01)

(56) References Cited

U.S. PATENT DOCUMENTS

| | | | | |
|---|---|---|---|---|
| 10,091,197 | B2* | 10/2018 | Rhoads | H04W 12/06 |
| 2005/0226468 | A1* | 10/2005 | Deshpande | H04M 1/72572 |
| | | | | 382/115 |
| 2009/0199264 | A1* | 8/2009 | Lang | G06F 21/57 |
| | | | | 726/1 |
| 2014/0361871 | A1 | 12/2014 | Silva et al. | |
| 2015/0074797 | A1* | 3/2015 | Choi | H04W 12/0605 |
| | | | | 726/19 |
| 2015/0135310 | A1* | 5/2015 | Lee | A61B 5/681 |
| | | | | 726/20 |
| 2015/0180865 | A1 | 6/2015 | Wong et al. | |
| 2015/0350207 | A1* | 12/2015 | Kim | H04L 63/105 |
| | | | | 713/170 |
| 2015/0371028 | A1* | 12/2015 | Patel | H04L 63/0853 |
| | | | | 726/16 |
| 2015/0381609 | A1* | 12/2015 | Dadu | G06F 21/32 |
| | | | | 726/9 |
| 2016/0147987 | A1* | 5/2016 | Jang | G06F 21/32 |
| | | | | 726/19 |
| 2016/0150124 | A1* | 5/2016 | Panda | H04N 1/4433 |
| | | | | 358/1.13 |
| 2016/0166936 | A1* | 6/2016 | Millegan | A63F 13/98 |
| | | | | 463/29 |
| 2016/0189451 | A1* | 6/2016 | Yoo | H04L 63/0861 |
| | | | | 340/5.82 |
| 2016/0217565 | A1* | 7/2016 | Mozer | A61B 5/117 |
| 2016/0253651 | A1* | 9/2016 | Park | G07F 9/023 |
| | | | | 705/39 |
| 2016/0259986 | A1* | 9/2016 | Yun | G02B 27/017 |
| 2016/0262021 | A1* | 9/2016 | Lee | H04W 12/06 |
| 2016/0267732 | A1* | 9/2016 | Agrafioti | A61B 5/0402 |
| 2017/0010658 | A1* | 1/2017 | Tanaka | G06F 3/016 |
| 2017/0011210 | A1* | 1/2017 | Cheong | G06F 21/32 |
| 2017/0032168 | A1* | 2/2017 | Kim | G04G 21/08 |
| 2017/0061414 | A1* | 3/2017 | Castinado | G06Q 20/206 |
| 2017/0118640 | A1* | 4/2017 | Lee | H04W 12/06 |
| 2017/0142589 | A1* | 5/2017 | Park | H04L 63/0853 |
| 2017/0199974 | A1* | 7/2017 | Chun | G16H 40/67 |
| 2017/0235935 | A1* | 8/2017 | Song | A61B 5/681 |
| | | | | 726/19 |
| 2017/0295173 | A1* | 10/2017 | Walsh | H04L 63/101 |
| 2018/0343123 | A1* | 11/2018 | Liu | H04L 9/3271 |

FOREIGN PATENT DOCUMENTS

| | | |
|---|---|---|
| CN | 104901801 A | 9/2015 |
| CN | 105281906 A | 1/2016 |
| CN | 105550878 A | 5/2016 |

* cited by examiner

IDENTITY AUTHENTICATION METHOD AND COMMUNICATIONS TERMINAL

CROSS-REFERENCE TO RELATED APPLICATIONS

This application is a National Stage of International Application No. PCT/CN2016/088039, filed on Jun. 30, 2016, which is hereby incorporated by reference in its entirety.

TECHNICAL FIELD

The present invention relates to the communications field, and specifically, to an identity authentication method and a communications terminal.

BACKGROUND

With development of mobile communications technologies, mobile terminals have been increasingly embedded into people's life, and more people use mobile terminals to perform privacy services such as payment. In this case, privacy security of a mobile terminal user starts to become increasingly important.

To ensure privacy service security of the mobile terminal user, a most common solution is to perform user identity authentication by using a password. Currently, identity authentication based on a biometric feature is used increasingly widely in addition to a conventional text password manner.

Currently, identity authentication based on a biometric feature is usually performing authentication based on a biometric feature, such as an electrocardiosignal (ECG signal for short) or a face recognition signal. There is no difference between different service authentication manners. Consequently, identity authentication efficiency and security are unsatisfactory.

SUMMARY

Embodiments of the present invention provide an identity authentication method and a communications terminal, to provide different authentication accuracy for different services and improve identity authentication efficiency and authentication security.

According to a first aspect, an embodiment of the present invention provides an identity authentication method, including: obtaining, by a terminal, first user identity feature data sent by a wearable device, and performing first identity authentication on the first user identity feature data; if the first identity authentication succeeds, and a worn status of the wearable device by a user is a valid worn state all the time from an authentication time point for the first identity authentication, when receiving an access request for a preset application, obtaining, by the terminal, a service security level of the preset application, and obtaining an authentication time point for second identity authentication and matching accuracy of the second identity authentication, where the second identity authentication is identity authentication performed by the terminal on second user identity feature data sent by the wearable device; determining whether a difference between a current time point and the authentication time point is less than authentication validity duration corresponding to the service security level and whether the matching accuracy is higher than lowest matching accuracy corresponding to the service security level; and accepting the access request if the difference between the current time point and the authentication time point is less than the authentication validity duration corresponding to the service security level and the matching accuracy is higher than the lowest matching accuracy corresponding to the service security level.

According to this embodiment of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

In a possible design, the second user identity feature data is second user identity feature data that is periodically sent by the wearable device and that is received by the terminal last time by means of a data communication connection between the terminal and the wearable device, so that the second user identity feature data that has been collected is directly used when the access request for the preset application is received, improving identity authentication efficiency.

In a possible design, an identity recognition accuracy level of the first identity authentication is higher than or equal to an identity recognition accuracy level of the second identity authentication. After the first identity authentication is performed by using the first user identity feature data and after the access request for the preset application is received subsequently, identity authentication can be performed by using the second user identity feature data with the lower accuracy level. This can also ensure service security.

In a possible design, the first user identity feature data includes at least one of the following types: electrocardiogram signal data, fingerprint signal data, password data, face recognition signal data, iris signal data, or sound signal data, and the second user identity feature data includes at least a type of photoplethysmography signal data, so that the identity recognition accuracy level of the first identity authentication is higher than the identity recognition accuracy level of the second identity authentication.

In a possible design, the method further includes: obtaining, by the terminal, the first user identity feature data sent by the wearable device, and determining whether the first user identity feature data matches preset user identity feature data successfully, so as to determine, when the first user identity feature data matches the preset user identity feature data successfully, that the wearable device succeeds in the first identity authentication on the first user identity feature data.

In a possible design, the method further includes: if the difference between the current time point and the authentication time point is greater than or equal to the authentication validity duration corresponding to the service security level or the matching accuracy is lower than or equal to the lowest matching accuracy corresponding to the service security level, obtaining third user identity feature data sent by the wearable device, and performing third identity authentication on the third user identity feature data, where a type of the third user identity feature data is the same as that of the first user identity feature data. In this case, when the second identity authentication fails, the third identity authentication whose accuracy level is the same as that of the first identity authentication is performed, to improve service authentication security.

In a possible design, the method further includes: if the first identity authentication fails, obtaining fourth user identity feature data sent by the wearable device, and performing fourth identity authentication on the fourth user identity feature data, where a type of the fourth user identity feature data is the same as that of the first user identity feature data. Because an authentication accuracy level of the fourth identity authentication is the same as that of the first identity authentication, when the first identity authentication fails, the fourth identity authentication whose authentication accuracy level is the same as that of the first identity authentication is performed, to ensure service authentication security.

According to a second aspect, an embodiment of the present invention further provides a communications terminal, including modules configured to execute the method in the first aspect of the embodiments of the present invention.

According to a third aspect, an embodiment of the present invention further provides a communications terminal, where the communications terminal includes a memory and a processor coupled with the memory, the memory is configured to store an instruction, the processor is configured to run the instruction, and the processor runs the instruction to perform some or all steps of any method in the first aspect of the embodiments of the present invention.

According to a fourth aspect, an embodiment of the present invention provides a computer storage medium, configured to store a computer software instruction used by the communications terminal provided in the second aspect, where the computer software instruction includes a program designed for executing the foregoing aspects.

According to a fifth aspect, an embodiment of the present invention provides a computer storage medium, configured to store a computer software instruction used by the communications terminal provided in the third aspect, where the computer storage medium includes a program designed for executing the foregoing aspects.

Compared with the prior art, in the solutions of the embodiments of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the purpose, technical solutions, and advantages of the embodiments of the present invention clearer, the following describes the technical solutions of the embodiments of the present invention with reference to the accompanying drawings in the embodiments of the present invention.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", and so on are intended to distinguish between different objects but do not indicate a particular order. In addition, the term "including" or any other variant thereof is intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following describes the embodiments of this application with reference to accompanying drawings.

Figure 1:
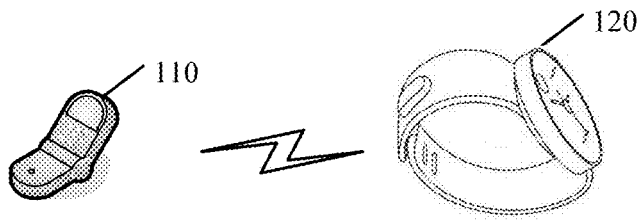
FIG. 1 is a structural diagram of an identity authentication system according to an embodiment of the present invention.

First, referring to FIG. 1, FIG. 1 is a structural diagram of an identity authentication system according to an embodiment of the present invention. Each identity authentication method provided in the embodiments of the present invention is implemented based on the identity authentication system. The identity authentication system shown in FIG. 1 includes a terminal no and a wearable device 120. The terminal may be a mobile terminal such as a mobile phone or a tablet computer on which a user application can be installed. Preferably, in this embodiment of the present invention, the terminal is a mobile phone; and the wearable device is a device such as a smartwatch, smart glasses, a smart ring, or a smart brooch worn on a corresponding part of a human body, and the wearable device has a function of collecting a biometric feature of a human body. Therefore, when the wearable device is in contact with a human body, a biometric feature of the human body may be collected. For example, when the wearable device is a smartwatch, and the smartwatch is worn on a hand, an ECG signal, a photoplethysmography (PPG for short) signal, or the like may be collected. The collection process may be automatic collection. For example, during PPG signal collection, collection may be automatically performed when a smart band is worn on a wrist. Alternatively, a person may need to participate in collection proactively. For example, during ECG signal collection, at least one finger of a user needs to press the wearable device to form a closed circuit, or during fingerprint signal collection, a user's finger needs to press the wearable device to perform collection. For another example, when the wearable device is another device that can be worn on a human body, the wearable device may collect other biometric feature data such as a fingerprint signal, a face recognition feature signal, an iris signal, or a sound signal.

In this embodiment of the present invention, a data communication connection between the wearable device and the terminal may be established by using Bluetooth, a wireless network (WiFi), a mobile data network, or the like; in this case, data communication between the terminal and the wearable device may be implemented based on the data communication connection. For example, the terminal may obtain, from the wearable device by means of the data communication connection, biometric feature data collected by the wearable device, and the terminal may also send, to the wearable device by means of the data communication connection, an identity authentication result data obtained after performing identity authentication on the biometric feature data.

The ECG signal in this embodiment of the present invention includes a P wave, a Q wave, an R wave, an S wave, a T wave, a U wave, and intervals between these waves. Crests of these waves and the intervals between these waves form feature points of the ECG signal. These feature points include rich individual physiological information, can be used for identity recognition due to their uniqueness, stability, universality, and measurability, and can bring high identity recognition accuracy.

The PPG signal in this embodiment of the present invention is detected by a photoelectric sensor by obtaining a blood flow quantity change within a heart period by means of photoplethysmography according to different strength of reflected light that is before and after the reflected light passes through blood and tissue in the human body. Because strength of a signal reflected by an optical signal changes when a blood flow quantity changes, and the blood flow quantity synchronously changes with regular heart fluctuation, a heart rate can be obtained according to an obtained pulse waveform.

A procedure of identity authentication based on the ECG signal or PPG signal in this embodiment of the present invention is: First, the ECG signal or PPG signal is collected; then, denoising processing is performed on the ECG signal or PPG signal; then, a time domain feature, a frequency domain feature, or the like of the ECG signal or PPG signal is extracted to perform identity recognition, which may be comparing the extracted feature with a preset feature to obtain a recognition result; and finally, the result is used to determine a user identity.

The following further details the embodiments of the present invention based on common features included in the embodiments of the present invention.

An embodiment of the present invention provides an identity authentication method, including: when receiving an access request for the preset application, obtaining, by a terminal, a service security level of a preset application; obtaining first user identity feature data sent by a wearable device, and performing first identity authentication on the first user identity feature data; if the first identity authentication succeeds, and a worn status of the wearable device by a user is a valid worn state, obtaining an authentication time point for second identity authentication to be performed on second user identity feature data sent by the wearable device and matching accuracy of the second identity authentication; determining whether a difference between a current time point and the authentication time point is less than authentication validity duration corresponding to the service security level and whether the matching accuracy is higher than lowest matching accuracy corresponding to the service security level; and accepting the access request if the difference between the current time point and the authentication time point is less than the authentication validity duration corresponding to the service security level and the matching accuracy is higher than the lowest matching accuracy corresponding to the service security level.

In this embodiment of the present invention, the terminal performs identity authentication twice, and when the terminal is connected to the wearable device, the terminal obtains the first identity feature data by using the wearable device, and performs the first identity authentication, to identify whether the wearable device has permission. After the first identity authentication succeeds, the second identity authentication is correspondingly performed according to the service security level. In this case, identity authentication accuracy is high, and security is improved. In addition, the second identity authentication is performed distinctively according to a service security level; therefore, identity authentication security is ensured, and identity authentication efficiency is high.

Figure 2:
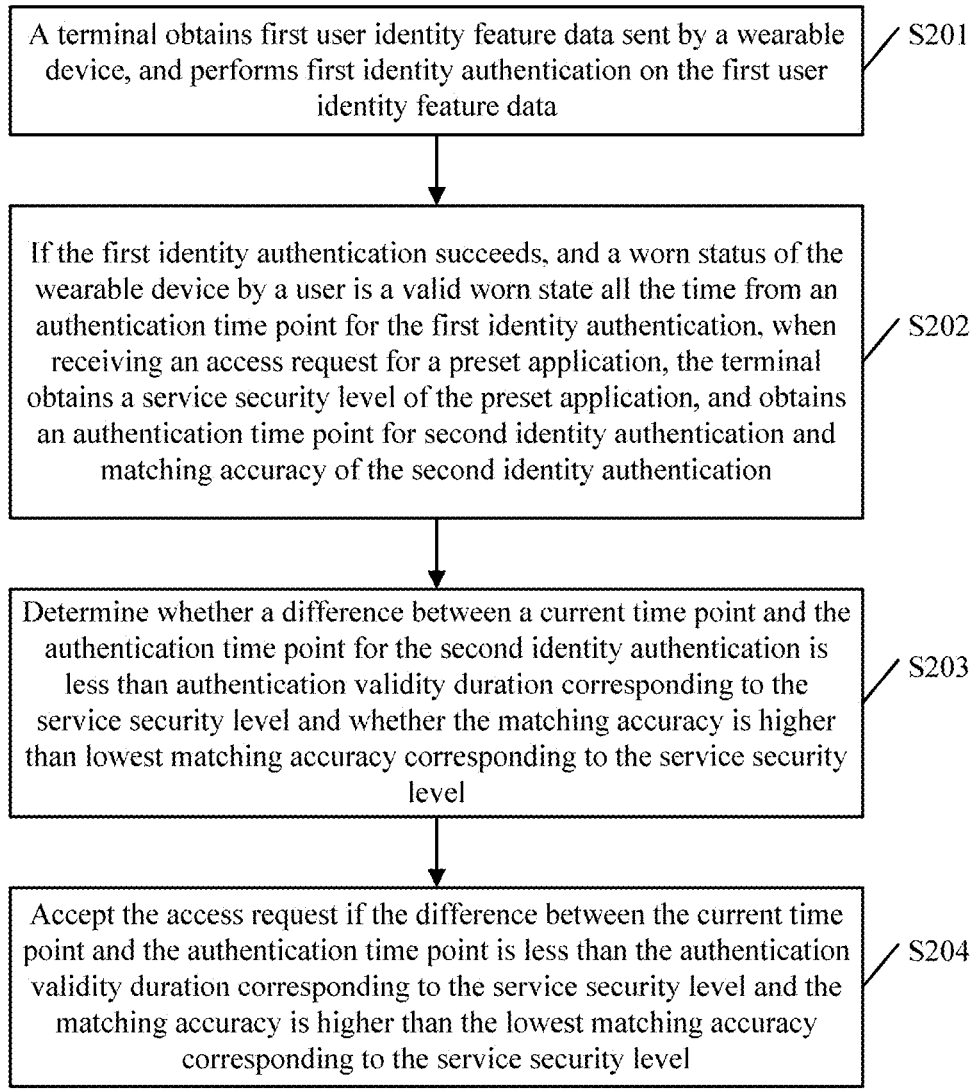
FIG. 2 is a schematic flowchart of Embodiment 1 of an identity authentication method according to the embodiments of the present invention.

With reference to FIG. 2, the following describes a method provided in an embodiment of the present invention. FIG. 2 is a schematic flowchart of an identity authentication method according to an embodiment of the present invention. As shown in FIG. 2, the method may include the following steps.

S201. A terminal obtains first user identity feature data sent by a wearable device, and performs first identity authentication on the first user identity feature data.

The identity authentication means: The terminal performs authentication according to user identity feature data obtained from the wearable device, to determine whether a user corresponding to the user identity feature data succeeds in the identity authentication. Correspondingly, if the user identity feature data is the first user identity feature data, the terminal performs the first identity authentication based on the first user identity feature data.

The first user identity feature data is biometric feature data collected by the wearable device from a human body. In this embodiment of the present invention, the first user identity feature data may include at least one of the following: electrocardiogram signal data, fingerprint signal data, password data, face recognition signal data, iris signal data, sound signal data, or photoplethysmography data. Due to uniqueness of a biometric feature, identity authentication can be performed accurately by using biometric feature data.

In this embodiment of the present invention, a data communication connection between the terminal and the wearable device is first established. To verify a user identity, after a user wears the wearable device for the first time, the user is instructed to collect the first user identity feature data to perform the first identity authentication, so as to determine that the user who wears the wearable device is a user having permission. In this case, during subsequent access to a terminal application, identity authentication can be performed by using identity feature data collected by using the wearable device.

Preferably, the first user identity feature data is ECG signal data. It can be understood that because of high authentication accuracy corresponding to the ECG signal data, an ECG signal may be used for authentication when user identity authentication is performed for the first time.

Optionally, in some possible implementations of the present invention, the first user identity feature data may alternatively be another biometric feature corresponding to an authentication accuracy level the same as that corresponding to an ECG signal. For example, the first biometric feature data may be fingerprint signal data, password data, face recognition signal data, iris signal data, sound signal data, or the like.

For example, in an example of the present invention, after a user wears the wearable device for the first time, the user is instructed to perform ECG signal collection for approximately 10 s to perform authentication. When the wearable device performs ECG signal collection, a method of performing measurement using two hands is generally used.

Optionally, in an embodiment of the present invention, after collecting the first user identity feature data, the wearable device may send the first user identity feature data to the terminal, and the terminal performs first identity authentication on the first user identity feature data.

Optionally, in another embodiment of the present invention, after collecting the first user identity feature data, the wearable device may perform first identity authentication on the first user identity feature data, and then send a first identity authentication result to the terminal.

S202. If the first identity authentication succeeds, and a worn status of the wearable device by a user is a valid worn state all the time from an authentication time point for the first identity authentication, when receiving an access request for a preset application, the terminal obtains a service security level of the preset application, and obtains an authentication time point for second identity authentication and matching accuracy of the second identity authentication.

The second identity authentication is identity authentication performed by the terminal on second user identity feature data sent by the wearable device.

In this embodiment of the present invention, a data communication connection between the terminal and the wearable device first needs to be established.

The preset application is an application that is installed on the terminal and whose application use security needs to be ensured by means of identity authentication. For example, the preset application may be a screen unlocking application, a payment application, a user defined privacy application, or the like. In this embodiment of the present invention, there is at least one preset application in the terminal.

In this embodiment of the present invention, because different applications are of different importance for a user, security levels of the different applications are different. For example, for a screen unlocking application and a payment application, obviously, a security level of the screen unlocking application may be set to be lower than a security level of the payment application, and for the payment application, a security level may alternatively be determined according to a payment limit or according to whether the payment application is a WeChat payment application or a bank payment application, or the like.

Preferably, in an example of the present invention, for a bank application operation service, a micropayment service, a large payment service, and a user defined privacy application related service, ascending order of security levels of these service types may be as follows: the bank application operation service, the micropayment service, the large payment service, and the user defined privacy application service.

Specifically, when receiving the access request for the preset application, the terminal obtains a service type of an application currently used by the terminal, and then determines a service security level of the service type.

A worn status of the wearable device by a user reflects a wearable device worn status by a user and a status change. The wearable device may be worn by the user or may fall off from the user. When the user wears the wearable device, it means that the wearable device is worn on the user's body part such as a hand, head, or breast. Specifically, when a smartwatch is worn, it means that the smartwatch is worn on the user's wrist in this embodiment of the present invention. When smart glasses are worn, it means that the smart glasses are worn on the user's head in this embodiment of the present invention. When a smart ring is worn, it means that the smart ring is worn on a user's finger in this embodiment of the present invention. When a smart brooch is worn, it means that the smart brooch is worn on the user's breast (which may be attached to clothing) in this embodiment of the present invention. When the wearable device falls off from the user, it means that the wearable device is taken off from a human body.

In this embodiment of the present invention, the worn status by the user is classified into a valid worn state and an invalid worn state. That the wearable device is in a valid worn state means that the wearable device never falls off from the authentication time point for the first identity authentication, that is, is in a worn state all the time. That is, the valid worn state is a worn state in which the wearable device keeps on being worn by the user all the time after the identity authentication is performed for the first time. In this case, the first identity authentication performed on the first user identity feature data collected in the valid worn state by using the wearable device is valid. The invalid worn state of the wearable device may be a state in which the user wears the wearable device for the first time. Therefore, a status from a time point when the wearable device falls off from the user to a time point when the wearable device becomes worn represents an invalid worn state.

Specifically, when being worn, the wearable device may be made to maintain a communication connection with the terminal. In this way, it may be deemed that the wearable device is in the valid worn state when the wearable device keeps maintaining the communication connection with the terminal after the first identity authentication. It may be determined that the wearable device has fallen off from the terminal after it is detected that the communication connection between the wearable device and the terminal is removed; in this case, it is deemed that the wearable device is in the invalid worn state even if the connection is established again.

Specifically, a sensor may be used to sense whether the wearable device is worn by a user. After the first identity authentication succeeds, if the sensor does not sense that the wearable device has ever been taken off from a human body, it is deemed that the wearable device is in the valid worn state. After the first identity authentication succeeds, if the sensor senses that the wearable device has ever been taken off from the human body, it is deemed that the wearable device is in the invalid worn state.

For example, in an example of the present invention, if the wearable device is a smart earphone, a pressure value detected by a pressure sensor may be used to determine whether the wearable device has ever been taken off from a human body. Because when the smart earphone is in a worn state, the pressure value detected by the wearable device is greater than a pressure value that is when the smart earphone falls off, if the pressure sensor detects a pressure value less than a specified threshold after the first identity authentication succeeds, it is determined that the smart earphone is in an invalid worn state at this time; otherwise, it is determined that the smart earphone is in a valid worn state.

For another example, in another example of the present invention, if the wearable device is a smart band, a photoelectric sensor may be installed on an inner surface of the smart band to detect whether the smart band has ever been taken off from a human body. Because the photoelectric sensor can sense an optical signal, when the smart band is worn on a hand, the photoelectric sensor senses a relatively weak optical signal or even no optical signal, and after the smart band is taken off, the photoelectric sensor may sense a relatively strong optical signal. In this case, if the photoelectric sensor senses no relatively strong optical signal after the smart band succeeds in the first identity authentication, it indicates that the smart band is in the valid worn state all the time after the smart band succeeds in the first identity authentication; otherwise, if the photoelectric sensor senses a relatively strong optical signal after the smart band succeeds in the first identity authentication, it is determined that the smart band is in the invalid worn state.

The second user identity feature data is biometric feature data collected by the wearable device from a human body. In this embodiment of the present invention, the second user identity feature data may include at least one of the following: electrocardiogram signal data, fingerprint signal data, password data, face recognition signal data, iris signal data, sound signal data, or photoplethysmography data PPG signal. Due to uniqueness of a biometric feature, identity authentication can be performed accurately by using biometric feature data.

In this embodiment of the present invention, after the terminal performs the first identity authentication on the wearable device, and when the wearable device is in the valid worn state all the time, identity authentication is performed again when the user's access request for the preset application is received.

The matching accuracy is a parameter used to indicate credibility of performing second user identity authentication by the terminal by using second user identity feature data. The matching accuracy may be a value obtained when matching is performed between the second user identity feature data and preset user identity feature data. The preset user identity feature data may be creditable user identity feature data. Therefore, if a degree of matching between the second user identity feature data and the preset user identity feature data is higher, it indicates that higher matching accuracy is obtained, and it indicates that credibility achieved when the second user identity feature data is used to perform identity authentication is higher. If a degree of matching between the second user identity feature data and the preset user identity feature data is lower, it indicates that lower matching accuracy is obtained, and corresponding credibility is lower.

For example, in an example of the present invention, when fingerprint feature data is used to perform identity authentication, fingerprint feature data of a user having permission is pre-stored in the terminal. In this case, when the wearable device is used to obtain the user's fingerprint, matching between fingerprint feature data corresponding to the fingerprint and the pre-stored fingerprint feature data is performed to obtain matching accuracy. In this case, higher matching accuracy indicates that fingerprint recognition of the user is more credible, and lower matching accuracy indicates lower credibility.

Preferably, an identity recognition accuracy level of the first identity authentication is higher than or equal to an identity recognition accuracy level of the second identity authentication.

An accuracy level is a parameter used to indicate a degree of user identification reliability of the identity authentication. A higher accuracy level indicates a higher degree of user identification reliability of the identity authentication. A lower accuracy level indicates a lower degree of user identification reliability of the identity authentication. It can be understood that when user identity feature data with a higher distinction degree is used to perform identity authentication, different users can be distinguished more accurately. Therefore, a higher degree of user identification reliability of corresponding identity authentication indicates a higher accuracy level, and a lower degree of user identification reliability of corresponding identity authentication indicates a lower level.

For example, in an example of the present invention, for an ECG signal and a PPG signal, because a distinction degree of the ECG signal is higher than that of the PPG signal for a different user, an identity recognition accuracy level corresponding to the ECG signal is higher than an identity recognition accuracy level corresponding to the PPG signal.

Preferably, the first user identity feature data includes at least one of the following types: ECG signal data, fingerprint signal data, password data, face recognition signal data, iris signal data, or sound signal data. The second user identity feature data includes at least a type of PPG signal data.

It should be noted that, generally, for a higher identity recognition accuracy level based on biometric feature data, a longer identity authentication time is required, and identity authentication efficiency is lower. For example, identity recognition accuracy corresponding to an ECG signal is higher than that is corresponding to a PPG signal, but an identity recognition speed corresponding to the ECG signal is lower than that corresponding to the PPG signal.

It should be noted that for fingerprint signal data and password data, although an identity recognition accuracy level is high and an identity authentication time is relatively short, a user needs to input a fingerprint or a password during identity authentication based on the fingerprint signal data or the password data. Therefore, it is relatively complex in operation. Similarly, low identity authentication efficiency is caused.

It can be understood that after the first identity authentication is performed by using the first user identity feature data and after the access request for the preset application is received subsequently, identity authentication can be performed by using the second user identity feature data with the lower accuracy level. This can also ensure service security.

Preferably, the second user identity feature data is a PPG signal. Compared with an ECG signal, identity recognition accuracy corresponding to the PPG signal is lower than that is corresponding to the ECG signal, but a recognition speed corresponding to the PPG signal is higher than that corresponding to the ECG signal. In addition, two hands need to be used in ECG signal collection, but the PPG signal can be collected automatically without requiring a person to participate in. Therefore, when the first identity authentication succeeds, the wearable device does not need to perform quite strict identity authentication on a user identity. In this case, a PPG signal corresponding to relatively low identity recognition accuracy and high recognition efficiency may be used to perform second identity authentication, to improve identity recognition efficiency.

In this embodiment of the present invention, the second user identity feature data may be not necessarily collected when the access request for the preset application is received. Correspondingly, it can be understood that the second identity authentication may be not necessarily performed when the access request for the preset application is received. In addition, generally, collection and authentication are performed a period of time before the terminal receives the access request for the preset application.

For example, in an example of the present invention, the second user identity feature data may be collected one minute before the access request for the preset application is received, and correspondingly, identity authentication may be performed on the second user identity feature data after the second user identity feature data is collected. This is equivalent to that any time before approximately one minute is not a time when the access request for the preset application is received, but the terminal may determine, according to a time, whether an authentication result of the second identity authentication is used.

Optionally, in some possible implementations of the present invention, the second user identity feature data may alternatively be second user identity feature data that the wearable device is triggered to collect after the terminal receives the access request for the preset application. In this case, the collection time for the second user identity feature data is after a time when the access request for the preset application is received. Then, the terminal obtains a second identity authentication result corresponding to the second user identity feature data. The second identity authentication may be performed by the terminal, or may be performed by the wearable device.

Specifically, the second user identity feature data is second user identity feature data that is periodically sent by the wearable device and that is received by the terminal last time by means of a data communication connection between the terminal and the wearable device.

For example, in an example of the present invention, after the first identity authentication succeeds, the terminal obtains a PPG signal from the wearable device every five minutes, and performs second identity authentication on the PPG signal.

Optionally, the second identity authentication may be performed by the terminal, that is, the terminal obtains the second user identity feature data from the wearable device and performs identity authentication on the second user identity feature data. For example, the terminal periodically obtains a PPG signal from the wearable device, performs identity authentication on the PPG signal, and records an authentication time for the second identity authentication and authentication accuracy of the second identity authentication, and finally, the terminal stores the last authentication time and authentication accuracy.

Optionally, the second identity authentication may alternatively be performed by the wearable device, that is, the wearable device performs authentication on the second user identity feature data and sends a second identity authentication result to the wearable device. For example, the wearable device periodically obtains a PPG signal, performs second identity authentication on the PPG signal, and sends a second identity authentication result and an authentication time point and authentication accuracy that are in the second identity authentication result, and finally, the terminal stores the last authentication time and authentication accuracy.

S203. Determine whether a difference between a current time point and the authentication time point for the second identity authentication is less than authentication validity duration corresponding to the service security level and whether the matching accuracy is higher than lowest matching accuracy corresponding to the service security level.

The authentication validity duration is a time that is preset for each preset application, that is corresponding to a service security level, and in which identity authentication is valid, and the authentication validity duration may be set in ascending order according to descending order of service security levels of preset applications. That is, a higher service security level indicates shorter authentication validity duration. In this case, only second identity authentication performed within the authentication validity duration is valid, second identity authentication that exceeds the time is invalid, and authentication needs to be performed again.

For example, in an example of the present invention, authentication validity duration for a bank application operation service may be set to eight minutes, authentication validity duration for a micropayment service may be set to five minutes, and authentication validity duration for a large payment service or a user defined application related service may be set to one minute.

The lowest matching accuracy is a minimum value that is preset for each preset application, that is corresponding to a service security level, and that is used to indicate matching accuracy of the second identity authentication performed when the preset application is accessed. That is, if the matching accuracy of the second identity authentication is greater than the lowest matching accuracy, it indicates that the authentication succeeds; or if the matching accuracy of the second identity authentication is less than or equal to the lowest matching accuracy, the second identity authentication is invalid, and authentication needs to be performed again.

Preferably, relative to the first identity authentication, identity recognition accuracy of the second identity authentication is lower. Therefore, different authentication validity duration and lowest matching accuracy are set for applications with different service security levels, so as to perform distinct authentication on different preset applications, improving authentication efficiency.

S204. Accept the access request if the difference between the current time point and the authentication time point is less than the authentication validity duration corresponding to the service security level and the matching accuracy is higher than the lowest matching accuracy corresponding to the service security level.

Optionally, the authentication time point and authentication accuracy are periodically obtained, and the access request is accepted when the difference between the current time point and the authentication time point is less than the authentication validity duration corresponding to the service security level and the matching accuracy is higher than the lowest matching accuracy of the service security level, so that when the terminal obtains the access request for the preset application, a periodically obtained authentication result can be directly used without a need to perform second identity authentication on a user when the access request for the preset application is received, improving identity authentication efficiency. In addition, for the user, a waiting time is reduced and user experience is improved.

It can be learned that in the solution of this embodiment, when receiving the access request for the preset application, the terminal obtains the service security level of the preset application; when first identity authentication of a user succeeds and the worn status of the wearable device by a user is the valid worn state, obtains the authentication time point for the second identity authentication performed on the second user identity feature data sent by the wearable device and the matching accuracy of the second identity authentication; and accepts the access request when the difference between the current time point and the authentication time point is less than the authentication validity duration corresponding to the service security level and the matching accuracy is higher than the lowest matching accuracy corresponding to the service security level. According to this embodiment of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

Optionally, in some possible implementations of the present invention, the obtaining first user identity feature data sent by a wearable device, and performing first identity authentication on the first user identity feature data includes: obtaining, by the terminal, the first user identity feature data sent by the wearable device, and determining whether the first user identity feature data matches preset user identity feature data successfully, so as to determine, when the first user identity feature data matches the preset user identity feature data successfully, that the wearable device succeeds in the first identity authentication on the first user identity feature data.

The preset user identity feature data is user identity feature data that is pre-stored in the terminal or the wearable device, that matches an eligible user, and that belongs to a type of the first user identity feature data. In this case, the obtained first user identity feature data may be compared with the preset user identity feature data to recognize a user identity.

Specifically, for example, in some possible implementations of the present invention, after obtaining an ECG signal sent by the wearable device, a user extracts ECG signal related feature data from the ECG signal, and performs matching between the extracted ECG signal related feature data and preset ECG signal related feature data. When a matching result is greater than a preset matching degree, it indicates that the first identity authentication succeeds.

Optionally, the first identity authentication process may be performed in the wearable device.

Optionally, in some possible implementations of the present invention, the method further includes: if the difference between the current time point and the authentication time point is greater than or equal to the authentication validity duration corresponding to the service security level or the matching accuracy is lower than or equal to the lowest matching accuracy corresponding to the service security level, obtaining third user identity feature data sent by the wearable device, and performing third identity authentication on the third user identity feature data, where a type of the third user identity feature data is the same as that of the first user identity feature data.

Preferably, if the first user identity feature data is an ECG signal, the third user identity feature data is also an ECG signal.

For example, in an example of the present invention, if a user uses an ECG signal to perform first identity authentication, when the user's large payment service access is received, second identity authentication is performed by using a PPG signal. If an authentication matching degree is lower than 95% of a preset authentication matching degree or a difference between a stored authentication time point and a current time point is less than one minute that is preset, it indicates that the authentication fails. To ensure authentication security, an ECG signal corresponding to higher authentication accuracy is used to perform first identity authentication again.

It can be understood that if the second identity authentication fails, third identity authentication whose accuracy level is the same as that of the first identity authentication is performed, to improve service authentication security.

Optionally, in some possible implementations of the present invention, the method further includes: if the first identity authentication fails, obtaining fourth user identity feature data sent by the wearable device, and performing fourth identity authentication on the fourth user identity feature data, where a type of the fourth user identity feature data is the same as that of the first user identity feature data.

It can be understood that because an authentication accuracy level of the fourth identity authentication is the same as that of the first identity authentication. If the first identity authentication fails, the fourth identity authentication is performed, to ensure service authentication security.

Still further, if authentication that is performed by using third user identity feature data whose type is the same as that of the first user identity feature data fails, other user identity feature data corresponding to matching accuracy the same as that corresponding to the first user identity feature data may be used to perform identity authentication. For example, if authentication performed by using an ECG signal fails, a fingerprint may be used to perform authentication.

Figure 3:
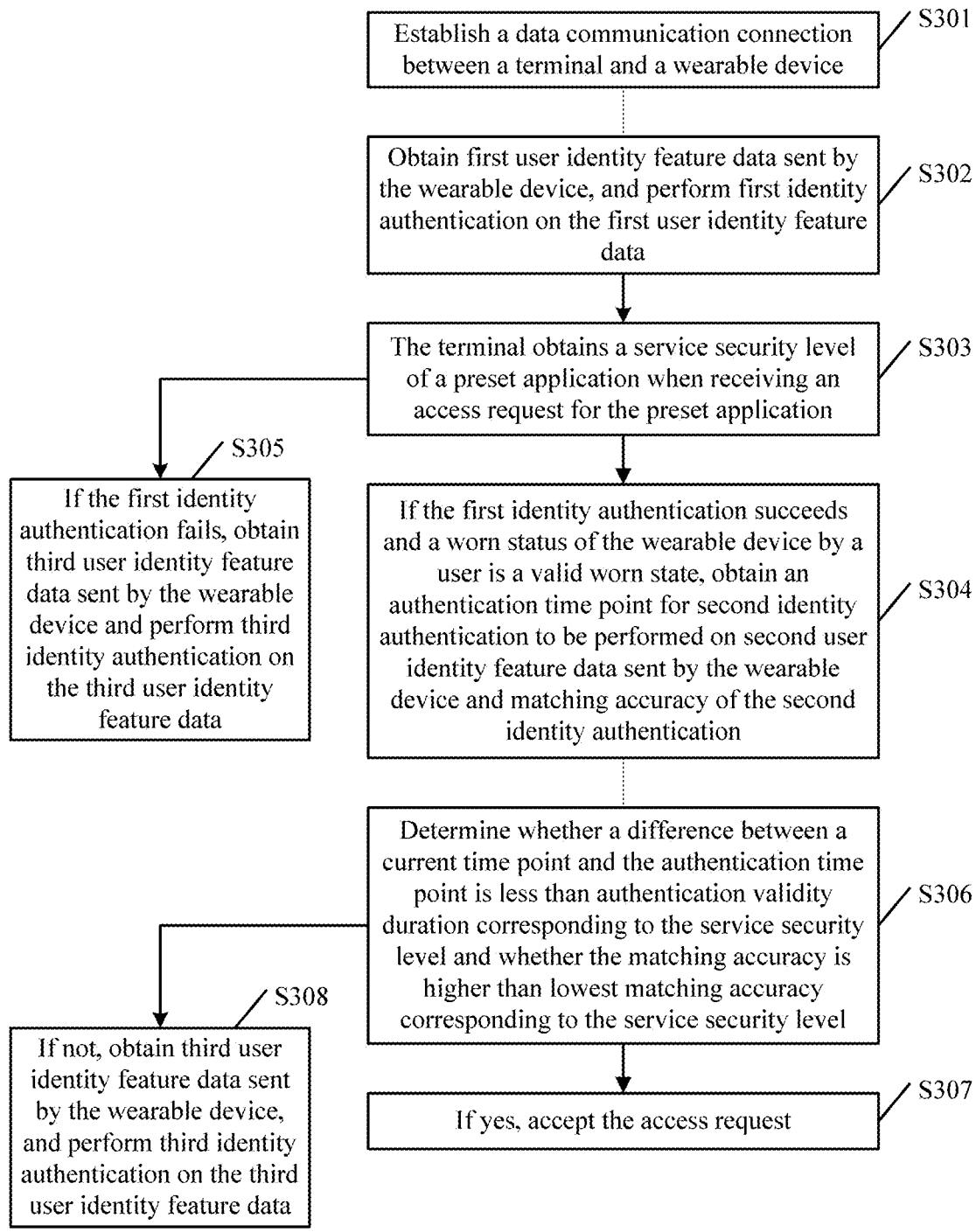
FIG. 3 is a schematic flowchart of Embodiment 2 of an identity authentication method according to the embodiments of the present invention.

To better understand and implement the foregoing solution in the embodiment of the present invention, the following further describes the embodiment of the present invention with reference to FIG. 3.

FIG. 2 is a schematic flowchart of another identity authentication method according to an embodiment of the present invention. In the method shown in FIG. 3, for content that is the same as or similar to that in the method shown in FIG. 2, refer to detailed descriptions in FIG. 2. Details are not described again herein. As shown in FIG. 3, the method may include the following steps.

S301. Establish a data communication connection between a terminal and a wearable device.

S302. Obtain first user identity feature data sent by the wearable device, and perform first identity authentication on the first user identity feature data.

S302. The terminal obtains a service security level of a preset application when receiving an access request for the preset application.

In this embodiment of the present invention, whether the first identity authentication succeeds is determined after first identity authentication is performed; and step S303 is performed if the first identity authentication succeeds and a worn status of the wearable device by a user is a valid worn state, or step S304 is performed if the first identity authentication fails.

S304. If the first identity authentication succeeds and a worn status of the wearable device by a user is a valid worn state, obtain an authentication time point for second identity authentication to be performed on second user identity feature data sent by the wearable device and matching accuracy of the second identity authentication.

S305. If the first identity authentication fails, obtain third user identity feature data sent by the wearable device and perform third identity authentication on the third user identity feature data.

A type of the third user identity feature data is the same as that of the first user identity feature data.

S306. Determine whether a difference between a current time point and the authentication time point is less than authentication validity duration corresponding to the service security level and whether the matching accuracy is higher than lowest matching accuracy corresponding to the service security level.

In this embodiment of the present invention, step S306 is performed if it is determined that the difference between the current time point and the authentication time point is less than the authentication validity duration corresponding to the service security level and the matching accuracy is higher than the lowest matching accuracy corresponding to the service security level.

If it is determined that the difference between the current time point and the authentication time point is greater than or equal to the authentication validity duration corresponding to the service security level or the matching accuracy is lower than or equal to the lowest matching accuracy corresponding to the service security level, third user identity feature data sent by the wearable device is obtained, third identity authentication is performed on the third user identity feature data, that is, step S307 is performed.

S307. Accept the access request if the difference between the current time point and the authentication time point is less than the authentication validity duration corresponding to the service security level and the matching accuracy is higher than the lowest matching accuracy corresponding to the service security level.

S308. If the difference between the current time point and the authentication time point is greater than or equal to the authentication validity duration corresponding to the service security level or the matching accuracy is lower than or equal to the lowest matching accuracy corresponding to the service security level, obtain third user identity feature data sent by the wearable device, and perform third identity authentication on the third user identity feature data.

A type of the third user identity feature data is the same as that of the first user identity feature data.

It can be learned that in the solution of this embodiment, when receiving the access request for the preset application, the terminal obtains the service security level of the preset application; when first identity authentication of a user succeeds and the worn status of the wearable device by a user is the valid worn state, obtains the authentication time point for the second identity authentication performed on the second user identity feature data sent by the wearable device and the matching accuracy of the second identity authentication; and accepts the access request when the difference between the current time point and the authentication time point is less than the authentication validity duration corresponding to the service security level and the matching accuracy is higher than the lowest matching accuracy corresponding to the service security level. According to this embodiment of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

An embodiment of the present invention further provides a communications terminal. The communications terminal includes: an obtaining module, configured for the terminal to: obtain first user identity feature data sent by a wearable device, and perform first identity authentication on the first user identity feature data, where the obtaining module is further configured to: if the first identity authentication succeeds, and a worn status of the wearable device by a user is a valid worn state all the time from an authentication time point for the first identity authentication, when the terminal receives an access request for a preset application, obtain a service security level of the preset application, and obtain an authentication time point for second identity authentication and matching accuracy of the second identity authentication, where the second identity authentication is identity authentication performed by the terminal on second user identity feature data sent by the wearable device; an authentication module, configured to: determine whether a difference between a current time point and the authentication time point is less than authentication validity duration corresponding to the service security level and whether the matching accuracy is higher than lowest matching accuracy corresponding to the service security level; and an accepting module, configured to accept the access request if the difference between the current time point and the authentication time point is less than the authentication validity duration corresponding to the service security level and the matching accuracy is higher than the lowest matching accuracy corresponding to the service security level.

Figure 4:
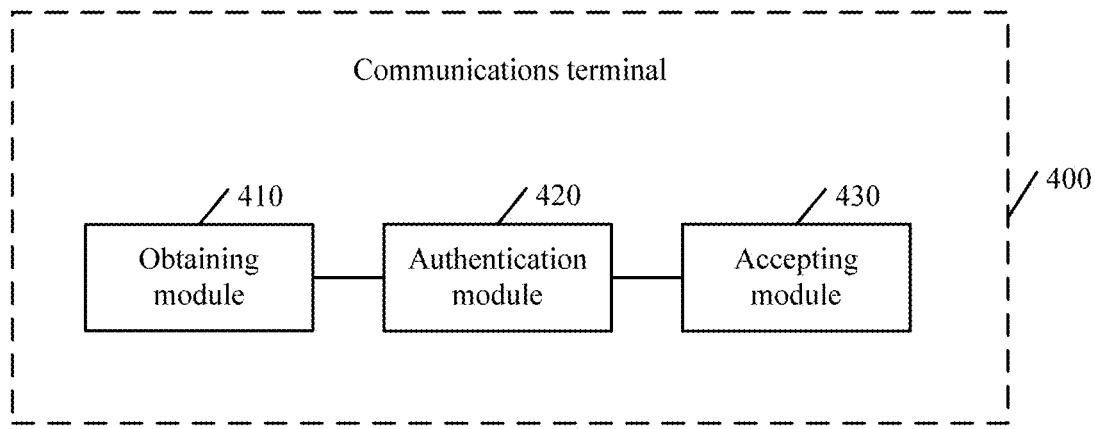
FIG. 4 is a schematic structural diagram of Embodiment 1 of a communications terminal according to the embodiments of the present invention.

Specifically, referring to FIG. 4, FIG. 4 is a schematic structural diagram of Embodiment 1 of a communications terminal according to the embodiments of the present invention. The communications terminal is configured to implement the identity authentication method disclosed in the embodiments of the present invention. As shown in FIG. 4, the communications terminal 400 provided in this embodiment of the present invention may include: an obtaining module 410, an authentication module 420, and an accepting module 430.

The obtaining module 410 is configured for the terminal to: obtain first user identity feature data sent by a wearable device, and perform first identity authentication on the first user identity feature data.

The obtaining module 410 is further configured to: if the first identity authentication succeeds, and a worn status of the wearable device by a user is a valid worn state all the time from an authentication time point for the first identity authentication, when the terminal receives an access request for a preset application, obtain a service security level of the preset application, and obtain an authentication time point for second identity authentication and matching accuracy of the second identity authentication. The second identity authentication is identity authentication performed by the terminal on second user identity feature data sent by the wearable device.

In this embodiment of the present invention, the preset application may be a screen unlocking application, a payment application, a user defined privacy application, or the like. In this embodiment of the present invention, there is at least one preset application in the terminal.

Preferably, in an example of the present invention, for a bank application access service, a micropayment service, a large payment service, and a user defined privacy information service, ascending order of security levels of these service types may be as follows: the bank application access service, the micropayment service, the large payment service, and the user defined privacy information service.

Optionally, in this embodiment of the present invention, the first user identity feature data includes at least one of the following: electrocardiogram signal data, fingerprint signal data, password data, face recognition signal data, iris signal data, sound signal data, or photoplethysmography data. Due to uniqueness of a biometric feature, identity authentication can be performed accurately by using biometric feature data.

Preferably, the first user identity feature data is ECG signal data.

Optionally, in this embodiment of the present invention, the second user identity feature data may include at least one of the following: electrocardiogram signal data, fingerprint signal data, password data, face recognition signal data, iris signal data, sound signal data, or photoplethysmography data PPG signal. Due to uniqueness of a biometric feature, identity authentication can be performed accurately by using biometric feature data.

Preferably, the second user identity feature data is a PPG signal.

The authentication module 420 is configured to: determine whether a difference between a current time point and the authentication time point is less than authentication validity duration corresponding to the service security level and whether the matching accuracy is higher than lowest matching accuracy corresponding to the service security level.

In this embodiment of the present invention, the authentication validity duration is a time that is preset for each preset application, that is corresponding to a service security level, and in which identity authentication is valid, and the authentication validity duration may be set in ascending order according to descending order of service security levels of preset applications.

In this embodiment of the present invention, the lowest matching accuracy is a minimum value that is preset for each preset application, that is corresponding to a service security level, and that is used to indicate matching accuracy of the second identity authentication performed when the preset application is accessed.

The accepting module 430 is configured to accept the access request if the difference between the current time point and the authentication time point is less than the authentication validity duration corresponding to the service security level and the matching accuracy is higher than the lowest matching accuracy corresponding to the service security level.

Optionally, in a possible implementation of the present invention, the authentication module 420 is specifically configured to: obtain the first user identity feature data sent by the wearable device, and determine whether the first user identity feature data matches preset user identity feature data successfully, so as to determine, when the first user identity feature data matches the preset user identity feature data successfully, that the wearable device succeeds in the first identity authentication on the first user identity feature data.

Optionally, in a possible implementation of the present invention, the second user identity feature data is second user identity feature data that is periodically sent by the wearable device and that is received by the terminal last time by means of a data communication connection between the terminal and the wearable device.

Optionally, in a possible implementation of the present invention, an identity recognition accuracy level of the first identity authentication is higher than or equal to an identity recognition accuracy level of the second identity authentication.

Optionally, in a possible implementation of the present invention, the first user identity feature data includes at least one of the following types: electrocardiogram signal data, fingerprint signal data, password data, face recognition signal data, iris signal data, or sound signal data, and the second user identity feature data includes at least a type of photoplethysmography signal data.

Optionally, in a possible implementation of the present invention, the authentication module 420 is further configured to: if the difference between the current time point and the authentication time point is greater than or equal to the authentication validity duration corresponding to the service security level or the matching accuracy is lower than or equal to the lowest matching accuracy corresponding to the service security level, obtain third user identity feature data sent by the wearable device, and perform third identity authentication on the third user identity feature data, where a type of the third user identity feature data is the same as that of the first user identity feature data.

Optionally, in a possible implementation of the present invention, the authentication module 420 is further configured to: if the first identity authentication fails, obtain fourth user identity feature data sent by the wearable device, and perform fourth identity authentication on the fourth user identity feature data, where a type of the fourth user identity feature data is the same as that of the first user identity feature data.

It can be learned that in the solution of this embodiment, when receiving the access request for the preset application, the communications terminal 400 obtains the service security level of the preset application; when first identity authentication of a user succeeds and the worn status of the wearable device by a user is the valid worn state, obtains the authentication time point for the second identity authentication performed on the second user identity feature data sent by the wearable device and the matching accuracy of the second identity authentication; and accepts the access request when the difference between the current time point and the authentication time point is less than the authentication validity duration corresponding to the service security level and the matching accuracy is higher than the lowest matching accuracy corresponding to the service security level. According to this embodiment of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

In this embodiment, the communications terminal 400 is presented in a form of a unit. Herein, the "unit" may be an application-specific integrated circuit (ASIC), a processor executing one or more software or firmware programs, a memory, an integrated logical circuit, and/or another component that can provide the foregoing functions.

It can be understood that functions of the functional units of the communications terminal 400 in this embodiment may be specifically implemented according to the method in the foregoing method embodiments. For a specific implementation process of the functions, refer to the related descriptions in the foregoing method embodiments. Details are not described again herein.

Figure 5:
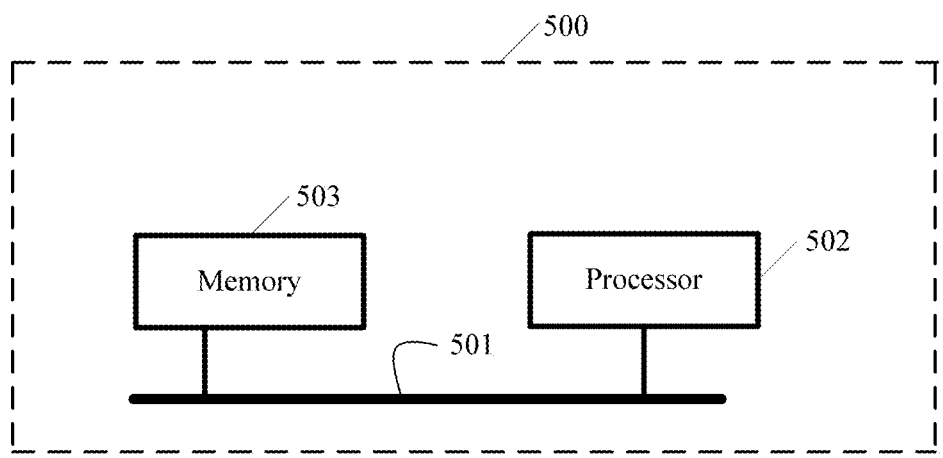
FIG. 5 is a schematic structural diagram of Embodiment 2 of a communications terminal according to the embodiments of the present invention.

Referring to FIG.5, FIG. 5 is a schematic structural diagram of Embodiment 2 of a communications terminal according to the embodiments of the present invention. The communications terminal is configured to implement the identity authentication method disclosed in the embodiments of the present invention. The communications terminal 500 may include at least one bus 501, at least one processor 502 connected to the bus 501, and at least one memory 503 connected to the bus 501.

The processor 502 invokes, by using the bus 501, code stored in the memory, so as to: obtain, by the terminal, first user identity feature data sent by a wearable device, and perform first identity authentication on the first user identity feature data; if the first identity authentication succeeds, and a worn status of the wearable device by a user is a valid worn state all the time from an authentication time point for the first identity authentication, when the terminal receives an access request for a preset application, obtain a service security level of the preset application, and obtain an authentication time point for second identity authentication and matching accuracy of the second identity authentication, where the second identity authentication is identity authentication performed by the terminal on second user identity feature data sent by the wearable device; determine whether a difference between a current time point and the authentication time point is less than authentication validity duration corresponding to the service security level and whether the matching accuracy is higher than lowest matching accuracy corresponding to the service security level; and accept the access request if the difference between the current time point and the authentication time point is less than the authentication validity duration corresponding to the service security level and the matching accuracy is higher than the lowest matching accuracy corresponding to the service security level.

Optionally, in some possible implementations of the present invention, the obtaining, by the processor 502, first user identity feature data sent by a wearable device, and performing first identity authentication on the first user identity feature data includes: obtaining, by the terminal, the first user identity feature data sent by the wearable device, and determining whether the first user identity feature data matches preset user identity feature data successfully, so as to determine, when the first user identity feature data matches the preset user identity feature data successfully, that the wearable device succeeds in the first identity authentication on the first user identity feature data.

Optionally, in some possible implementations of the present invention, the second user identity feature data is second user identity feature data that is periodically sent by the wearable device and that is received by the terminal last time by means of a data communication connection between the terminal and the wearable device.

Optionally, in some possible implementations of the present invention, an identity recognition accuracy level of the first identity authentication is higher than or equal to an identity recognition accuracy level of the second identity authentication.

Optionally, in some possible implementations of the present invention, the processor 502 is further configured to: if the difference between the current time point and the authentication time point is greater than or equal to the authentication validity duration corresponding to the service security level or the matching accuracy is lower than or equal to the lowest matching accuracy corresponding to the service security level, obtain third user identity feature data sent by the wearable device, and perform third identity authentication on the third user identity feature data, where a type of the third user identity feature data is the same as that of the first user identity feature data.

Optionally, in some possible implementations of the present invention, the processor 502 is further configured to: if the first identity authentication fails, obtain fourth user identity feature data sent by the wearable device, and perform fourth identity authentication on the fourth user identity feature data, where a type of the fourth user identity feature data is the same as that of the first user identity feature data.

It can be learned that in the solution of this embodiment, when receiving the access request for the preset application, the communications terminal 500 obtains the service security level of the preset application; when first identity authentication of a user succeeds and the worn status of the wearable device by a user is the valid worn state, obtains the authentication time point for the second identity authentication performed on the second user identity feature data sent by the wearable device and the matching accuracy of the second identity authentication; and accepts the access request when the difference between the current time point and the authentication time point is less than the authentication validity duration corresponding to the service security level and the matching accuracy is higher than the lowest matching accuracy corresponding to the service security level. According to this embodiment of the present invention, identity authentication is performed twice, and during the second identity authentication, different authentication validity duration and matching accuracy are set for preset applications with different service security levels; in this way, authentication efficiency and security of the identity authentication are higher, the identity authentication method better meets a user requirement, and user experience is improved.

In this embodiment, the communications terminal 500 is presented in a form of a unit. Herein, the "unit" may be an application-specific integrated circuit (ASIC), a processor executing one or more software or firmware programs, a memory, an integrated logical circuit, and/or another component that can provide the foregoing functions.

It can be understood that functions of the functional units of the communications terminal 500 in this embodiment may be specifically implemented according to the method in the foregoing method embodiments. For a specific implementation process of the functions, refer to the related descriptions in the foregoing method embodiments. Details are not described again herein.

Methods or algorithm steps described with reference to the content disclosed in this embodiment of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a base station or a terminal. Certainly, the processor and the storage medium may alternatively exist in a base station or a terminal as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A communications terminal comprising:
at least one processor; and
a memory coupled to the at least one processor and storing programming instructions for execution by the at least one processor, the programming instructions instruct the at least one processor to perform operations comprising:
obtaining first user identity feature data sent by a wearable device, and performing first identity authentication on the first user identity feature data;
determining that the first identity authentication succeeds and that a worn status of the wearable device by a user is a valid worn state all of time from an authentication time point for the first identity authentication to verify that the user is authenticated;
receiving an access request for a preset application;
obtaining a service security level of the preset application, the obtaining the service security level of the preset application comprising:
determining a type of the preset application; and
obtaining the service security level of the preset application based on the type of the preset application,
wherein a lowest matching accuracy corresponding to the service security level is one of a plurality of lowest matching accuracies, the plurality of lowest matching accuracies further include a second lowest matching accuracy corresponding to a second service security level of a second preset application;
obtaining a second authentication time point for second identity authentication and a matching accuracy of the second identity authentication, wherein the second identity authentication is identity authentication performed by the communications terminal on second user identity feature data sent by the wearable device;
determining whether a difference between a current time point and the second authentication time point for the second identity authentication is less than an authentication validity duration corresponding to the service security level of the preset application and whether the matching accuracy is higher than the lowest matching accuracy corresponding to the service security level, wherein the authentication validity duration corresponding to the service security level is one of a plurality of authentication validity durations, the plurality of authentication validity durations further include a second authentication validity duration corresponding to the second service security level of the second preset application; and
accepting the access request in response to determining that the difference between the current time point and the authentication time point is less than the authentication validity duration corresponding to the service security level of the preset application and the matching accuracy is higher than the lowest matching accuracy corresponding to the service security level of the preset application.

2. The communications terminal according to claim 1, wherein the second user identity feature data is periodically sent by the wearable device and that is received by the communications terminal last time by means of a data communication connection between the communications terminal and the wearable device.

3. The communications terminal according to claim 1, wherein an identity recognition accuracy level of the first identity authentication is higher than or equal to a second identity recognition accuracy level of the second identity authentication.

4. The communications terminal according to claim 1, wherein the first user identity feature data comprises at least one of: electrocardiogram signal data, fingerprint signal data, password data, face recognition signal data, iris signal data, or sound signal data, and wherein the second user identity feature data comprises at least a type of photoplethysmography signal data.

5. The communications terminal according to claim 1, wherein the obtaining the first user identity feature data sent by the wearable device, and performing the first identity authentication on the first user identity feature data comprises:
obtaining, by the communications terminal, the first user identity feature data sent by the wearable device, and determining whether the first user identity feature data matches preset user identity feature data successfully, so as to determine, when the first user identity feature data matches the preset user identity feature data successfully, that the wearable device succeeds in the first identity authentication on the first user identity feature data.

6. The communications terminal according to claim 1, wherein the operations comprise:
in response to determining that the difference between the current time point and the second authentication time point for the second identity authentication is greater than or equal to the authentication validity duration corresponding to the service security level or the matching accuracy is lower than or equal to the lowest matching accuracy corresponding to the service security level, obtaining third user identity feature data sent by the wearable device, and performing third identity authentication on the third user identity feature data, wherein a type of the third user identity feature data is the same as that of the first user identity feature data.

7. The communications terminal according to claim 1, wherein the operations comprise:
in response to determining that the first identity authentication fails, obtaining fourth user identity feature data sent by the wearable device, and performing fourth identity authentication on the fourth user identity feature data, wherein a type of the fourth user identity feature data is the same as that of the first user identity feature data.

8. A communications terminal comprising:
at least one processor; and
a memory coupled to the at least one processor and storing programming instructions for execution by the at least one processor, the programming instructions instruct the at least one processor to perform operations comprising:
obtaining first biometric feature data of a user from a wearable device;
authenticating the user by comparing the first biometric feature data to first user identity feature data;
determining that the first biometric feature data matches the first user identity feature data;
receiving an access request for an application;
generating an authentication result using second biometric feature data and second user identity feature data;
comparing (1) a difference between a current time point and an authentication time point for second biometric feature data authentication and (2) an authentication validity duration corresponding to a service security level of the application, wherein the service security level of the application is obtained based on a type of the application, wherein a lowest matching accuracy corresponding to the service security level is one of a plurality of lowest matching accuracies, the plurality of lowest matching accuracies further include a second lowest matching accuracy corresponding to a second service security level of a second application, wherein the authentication validity duration is one of a plurality of authentication validity durations, the plurality of authentication validity durations further include a second authentication validity duration corresponding to the second service security level of the second application; and
based on a worn status of the wearable device, the authentication result, and the comparing, determining whether to accept the access request.

9. The communications terminal according to claim 8, wherein the operations comprise:
obtaining the service security level of the application;
obtaining a matching accuracy of the second biometric feature data; and
determining whether the matching accuracy is higher than the lowest matching accuracy corresponding to the service security level.

10. The communications terminal according to claim 8, wherein an identity recognition accuracy level of the first biometric feature data is higher than or equal to a second identity recognition accuracy level of the second biometric feature data.

11. The communications terminal according to claim 8, wherein the first biometric feature data comprises at least one of: electrocardiogram signal data, fingerprint signal data, password data, face recognition signal data, iris signal data, or sound signal data, and wherein the second biometric feature data comprises photoplethysmography signal data.

12. The communications terminal according to claim 8, wherein the determining whether to accept the access request comprises:
determining that the worn status of the wearable device by the user is a valid worn state all of time from an authentication time point for first biometric feature data authentication;
obtaining, by the communications terminal, the service security level of the application, and obtaining a second authentication time point for the second biometric feature data authentication and a matching accuracy of the second biometric feature data authentication; and
determining whether the difference between the current time point and the second authentication time point for the second biometric feature data authentication is less than the authentication validity duration corresponding to the service security level and whether the matching accuracy is higher than the lowest matching accuracy corresponding to the service security level; and
accepting the access request in response to determining that the difference between the current time point and the second authentication time point for the second biometric feature data authentication is less than the authentication validity duration corresponding to the service security level and the matching accuracy is higher than the lowest matching accuracy corresponding to the service security level.

13. The communications terminal according to claim 8, wherein the operations comprise:
determining whether a difference between the current time point and an authentication time point for first biometric feature authentication is less than a first authentication validity duration; and
in response to determining that the difference between the current time point and the authentication time point for the first biometric feature authentication is greater than or equal to the first authentication validity duration, authenticating, by the communications terminal, the user by comparing third biometric feature data to the first user identity feature data, wherein a type of the third biometric feature data is the same as that of the first biometric feature data.

14. The communications terminal according to claim 8, wherein the operations comprise:
in response to determining that a matching accuracy is not higher than the lowest matching accuracy corresponding to the service security level, authenticating, by the communications terminal, the user by comparing fourth biometric feature data to the first user identity feature data, wherein a type of the fourth biometric feature data is the same as that of the first biometric feature data.

15. A system comprising:
a wearable device comprising a first memory comprising first instructions and at least one first processor in communication with the first memory, the first instructions being configured to instruct the at least one first processor to:
detect first biometric feature data and second biometric feature data of a user; and
detect a worn status of the wearable device; and
a terminal comprising a second memory comprising second instructions and at least one second processor in communication with the second memory, the second instructions being configured to instruct the at least one second processor to:
obtain the first biometric feature data from the wearable device;
authenticate, by the terminal, the user by comparing the first biometric feature data to first user identity feature data;
determine that the first biometric feature data matches the first user identity feature data;
receive an access request for an application;

generate an authentication result using second biometric feature data and second user identity feature data;

compare (1) a difference between a current time point and a time point of an authentication time point for second biometric feature data authentication and (2) an authentication validity duration corresponding to a service security level of the application, wherein the service security level of the application is obtained based on a type of the application, wherein a lowest matching accuracy corresponding to the service security level is one of a plurality of lowest matching accuracies, the plurality of lowest matching accuracies further include a second lowest matching accuracy corresponding to a second service security level of a second application, wherein the authentication validity duration is one of a plurality of authentication validity durations, the plurality of authentication validity durations further include a second authentication validity duration corresponding to the second service security level of the second application; and based on the worn status of the wearable device, the an authentication result, and comparison between the difference and the authentication validity duration, determine whether to accept the access request.

16. The system according to claim 15, wherein the terminal is configured to:

obtain the service security level of the application;

obtain a matching accuracy of the second biometric feature data; and determine whether the matching accuracy is higher that the lowest matching accuracy corresponding to the service security level.

17. The system according to claim 15, wherein an identity recognition accuracy level of the first biometric feature data is higher than or equal to a second identity recognition accuracy level of the second biometric feature data.

18. The system according to claim 15, wherein the first biometric feature data comprises at least one of: electrocardiogram signal data, fingerprint signal data, password data, face recognition signal data, iris signal data, or sound signal data.

19. The system according to claim 15, wherein the second biometric feature data comprises photoplethysmography signal data.

20. system according to claim 15, the second instructions being further configured to instruct the at least one second processor to:

determine whether a difference between the current time point and an authentication time point for first biometric feature authentication is less than a first authentication validity duration; and in response to determining that the difference between the current time point and the authentication time point for the first biometric feature authentication is greater than or equal to the first authentication validity duration, authenticate, by the terminal, the user by comparing third biometric feature data to the first user identity feature data, wherein a type of the third biometric feature data is the same as that of the first biometric feature data.

* * * * *